N. J. CABLE.
Filters.

No. 153,535. Patented July 28, 1874.

Witnesses
J H Shumway
A. J. Tibbits

Nathaniel J. Cable
Inventor
By atty.
John J. Earle

UNITED STATES PATENT OFFICE.

NATHANIEL J. CABLE, OF DANBURY, CONNECTICUT.

IMPROVEMENT IN FILTERS.

Specification forming part of Letters Patent No. 153,535, dated July 28, 1874; application filed June 24, 1874.

*To all whom it may concern:*

Be it known that I, NATHANIEL J. CABLE, of Danbury, in the county of Fairfield and State of Connecticut, have invented a new Improvement in Filters; and I do hereby declare the following, when taken in connection with the accompanying drawings and the letters of reference marked thereon, to be a full, clear, and exact description of the same, and which said drawings constitute part of this specification, and represent, in—

Figure 1:
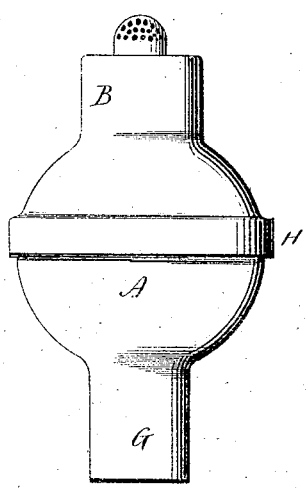
Figure 2:
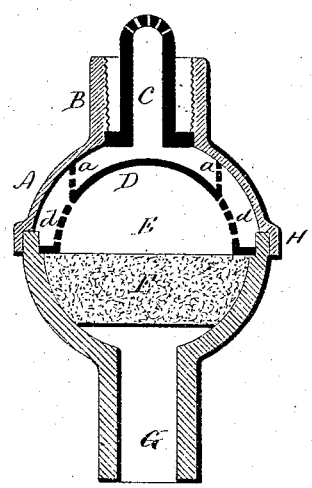

Figure 1, a side view, and in Fig. 2 a vertical central section.

This invention relates to an improvement in the construction of water-filters, the object being to more perfectly filter the water than can be done by the ordinary filtering material; and it consists in a filter in which a tubular strainer extends up into the supply-pipe, combined with a second strainer below, and a felt or equivalent filtering material, through which the water passes after having passed through said two strainers.

A is the case, which is preferably made of spherical form, with a coupling, B, formed upon its upper end, for the purpose of connecting to the supply-pipe. Within this coupling is a tube, C, extending up into the supply-pipe, its upper end closed but finely perforated, as shown in the drawings. The water, therefore, in coming to the filter, must pass through the perforations from the outside to the inside, before it can flow to the filtering material or discharge below. This strainer is applicable to filters of many constructions. Within the case is a dome-shaped or hemispherical partition, of less diameter than the shell, and upon which the water will strike as it flows into the filter. Around this partition D an annular partition, a, is arranged, which divides the chamber between the partition D and the shell, as seen in Fig. 2. This partition a and the portion d of the partition below are finely perforated, to form a second strainer, through which the water must pass to reach the chamber E. Passing into this chamber E, the water comes directly upon a block, F, of felt or other filtering material, through which the water permeates to the discharge G, from whence it passes off completely and perfectly filtered.

The case is made separable at H for the purpose of repairing the filter, should occasion require.

I claim as my invention—

1. The herein-described filter consisting of the shell A, tubular strainer C, perforated partitions a D, the water-chamber E, and the filtering material F, substantially as specified.

2. The tubular strainer C, extending up within the supply-pipe for filters, substantially as and for the purpose described.

NATHANIEL J. CABLE.

Witnesses:
DAVID B. BOODER,
HORACE A. ROFF.